Oct. 17, 1933.  J. GASKELL  1,930,999

ROLLER FOR DRAWING FLAT SHEET GLASS

Filed Feb. 2, 1933

Inventor.
Joseph Gaskell
By
Marison, Kennedy & Campbell
ATTORNEYS

Patented Oct. 17, 1933

1,930,999

UNITED STATES PATENT OFFICE 1,930,999

ROLLER FOR DRAWING FLAT SHEET GLASS

Joseph Gaskell, St. Helens, England, assignor to Pilkington Brothers Limited, Liverpool, England, a company of England Application February 2, 1933, Serial No. 654,864, and in Great Britain March 12, 1932

3 Claims. (Cl. 49—17)

This invention relates to flat sheet drawing apparatus and has for its object an improved construction of roller drawing apparatus.

The invention is applicable to rollers, covered with asbestos or other heat resisting material liable to shrink, which are employed for drawing flat drawn glass through lehrs or towers.

Rollers of this kind have usually been constructed by threading discs of asbestos or compounds containing asbestos on a square or hexagonal shaft, compressing these discs between a fixed and a loose collar, and, when the discs are under high pressure, retaining them under this pressure by fixing the loose collar on the shaft by pinning or the like.

It is found that the discs so compressed gradually become loose in use. It is believed that the main reason therefore is that the asbestos shrinks as a result of its water of hydration being driven off by the high temperature given to the asbestos by the hot glass and that to which the whole roller is subjected in the tower or lehr.

Once the discs become loose, the surface of the roller is liable to be cut by pieces of broken glass and to retain broken glass. Furthermore, their drive no longer depends on friction but has to depend on the drive by the square or hexagonal shaft, and the discs so driven are found liable to break.

It has been found impracticable to employ ordinary means of compressing the discs as they become loose, such as a nut screw-threaded on the shaft, because any screws or close-fitting parts become fast after being subjected to heat either within the tower or lehr casing or between the casing and the bearings of the roller-shaft.

Further, flat glass drawing apparatus customarily operates for many weeks without interruption; in fact, its operation is stopped only when some part of the apparatus requires repair. Adjustment of any part within the tower or lehr casing, during operation of the apparatus is impracticable or difficult.

According to the invention, the asbestos or the like bears against a fixed abutment at one end of the roller and a movable abutment at the other end, and the latter is operable by means located at the extreme end of the shaft. The movable abutment may be engaged by a cotter passing through a slot in the shaft, the cotter being operable by means of a rod passing through the shaft and engaging a bolt or nut at the extreme end of the shaft.

In the accompanying drawing:—

Figure 1:
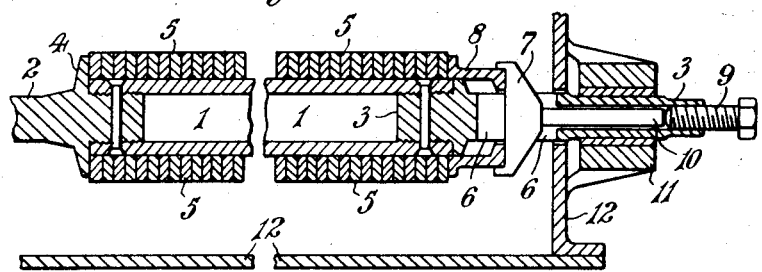
Figure 2:
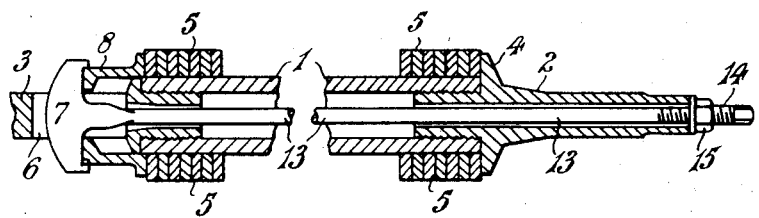

Figure 1 is a section of a roller, partly broken away, showing a portion of a casing such as is used in vertical drawing machines, and Figure 2 is a similar view of an alternative form of roller, the casing being omitted.

Referring to Figure 1, the roller shaft is composed of a tubular portion 1 and end pieces 2 and 3 on which are formed the bearings and to which are attached the driving means of the roller. The end piece 2 has a flange 4 forming a fixed abutment for the asbestos discs 5. The end piece 3 has a slot 6, through which passes freely a cotter 7, which engages a movable abutment or bush 8 adapted to slide over the shaft 1 and bear against the asbestos discs 5.

The right-hand end of the end piece 3 has a central hole screw-threaded at the end to take the bolt 9. A rod 10 in the central hole forms a distance piece between the bolt 9 and the cotter 7. The asbestos discs 5 can, therefore, be compressed by screwing in the bolt 9.

The roller is supported in a bearing 11 on the casing 12.

In the form of roller described above, the asbestos discs can be compressed at any time by means of the bolt 9, and, since the rollers turn slowly, during operation of the apparatus. The screw-thread of the bolt 9, being outside the casing and beyond the bearing, does not get so hot that it is liable to become fast, and the parts 10, 7 and 8 which have to move in compressing the discs, can be made sufficiently free to avoid any liability of their becoming fast. Since the asbestos discs can always be maintained under high pressure, it is unnecessary to provide any driving means, other than friction, and the disadvantages of driving by means of a square or hexagonal shaft are avoided.

Referring to Figure 2, in which similar parts have the same reference numbers as in Figure 1, the cotter 7 is formed on the end of a rod 13 which passes through the roller shaft and through the end piece 2 and terminates in a screw-threaded portion 14 provided with a nut 15. The asbestos discs 5 are compressed by screwing up the nut 15.

Rollers constructed in accordance with the invention have the further advantage that, when the operation of the drawing apparatus is stopped, the pressure on the discs can be relieved before the tower or lehr cools, and undue pressure due to contraction of the roller shaft is avoided.

The two constructional forms of roller described above are by way of example, since the invention can be carried out in other constructional forms.

Having described my invention, I declare that what I claim and desire to secure by Letters Patent is:—

1. Roller for flat glass drawing machines comprising a shaft, a covering of compressible heat-resisting material, an abutment therefor at one end and a movable abutment therefor at the other end, bearings on the shaft outside the abutments and means located outside the bearings to move the movable abutment to compress the said material.

2. Roller for flat glass drawing machines comprising a shaft, a covering of compressible heat-resisting material, an abutment therefor at one end and a movable abutment therefor at the other end, bearings on the shaft outside the abutments, a cotter traversing the shaft and engaging the movable abutment and means located outside the bearings adapted to move the cotter to compress the said material.

3. Roller for flat glass drawing machines comprising a shaft, a covering of compressible heat-resisting material, an abutment therefor at one end and a movable abutment therefor at the other end, bearings on the shaft outside the abutments, a cotter traversing the shaft and engaging the movable abutment, a rod passing longitudinally through the shaft and engaging the cotter and means for moving the rod to compress the said material.

JOSEPH GASKELL.